W. M. SMITH.
SPRING WHEEL.
APPLICATION FILED JULY 6, 1918.

1,298,592.

Patented Mar. 25, 1919.

Witnesses
R. A. Thomas.
L. B. Middleton.

Inventor
W. M. Smith

By Victor J. Evans
Attorney

UNITED STATES PATENT OFFICE.

WILLIAM M. SMITH, OF WOODWARD, OKLAHOMA.

SPRING-WHEEL.

1,298,592.  Specification of Letters Patent.  Patented Mar. 25, 1919.

Application filed July 6, 1918. Serial No. 243,521.

*To all whom it may concern:*

Be it known that I, WILLIAM M. SMITH, a citizen of the United States, residing at Woodward, in the county of Woodward and State of Oklahoma, have invented new and useful Improvements in Spring-Wheels, of which the following is a specification.

This invention relates to new and useful improvements in spring wheels and the principal object of the invention is to make the wheel entirely of metal with novel means for securing the spokes to the hub and to provide a tire formed of spring metal.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
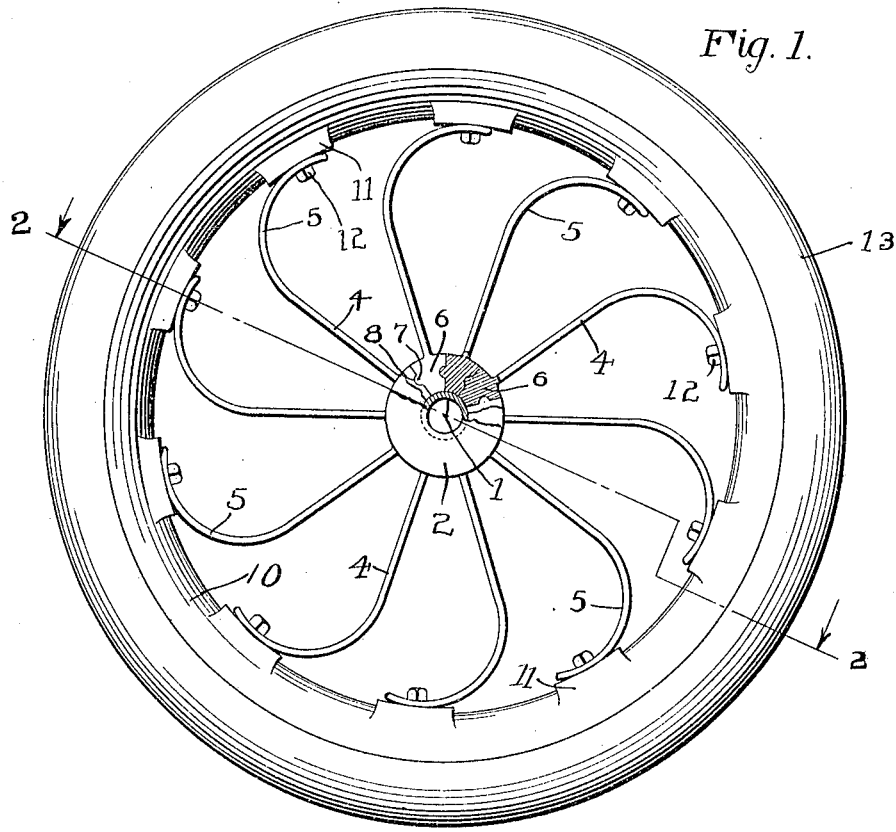
Figure 1 is a front view of the wheel with parts broken away to show the interior construction.
Figure 2:
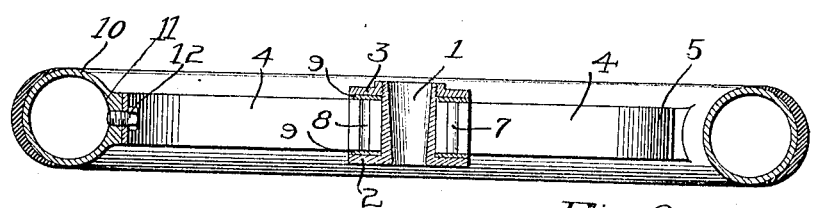
Fig. 2 is a section on line 2—2 of Fig. 1.
Figure 3:
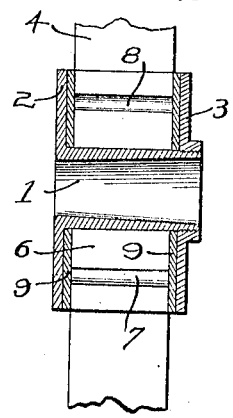
Fig. 3 is an enlarged sectional view through the hub.

As shown in these views the wheel comprises the hub bushing 1 having the flange 2 at one end and its other end screw threaded to receive the movable flange 3. 4 indicates the spokes made of flat pieces of spring metal and having their outer ends of curved shape as shown at 5 and their inner ends provided with wedge shaped enlargements 6. Each of these enlargements is provided with a rib 7 on one side and a groove 8 on the other side, said groove receiving the rib on the adjacent enlargement as clearly shown in Fig. 1. In this manner the enlargements are firmly locked together and when placed together form a complete circle. These enlargements are placed between the flanges between the end plates 9 which are held in place by means of the flanges 2 and 3. 10 indicates the tube made from spring metal and having reinforcements 11 spaced apart on its inner circumference to receive the bolts 12 which secure the curved ends of the spokes to the tube. This tube receives an outer covering of rubber or like material 13 which may be secured to the tube in any desired manner.

It will thus be seen that an extremely light wheel is provided which has great strength and is very resilient. It may be used without the rubber covering though such covering will improve the operation of the wheel.

If a spoke should break or if it should become necessary to move one for any reason this can be easily done by removing the flange 3 and the plate to expose the wedge shaped inner ends of the spokes. The spoke may be removed by drawing the wedge shaped end laterally away from the other ends.

It is thought from the foregoing description that the advantages and novel features of my invention will be readily apparent.

I desire it to be understood that I may make such changes in the construction and in the combination and arrangement of the several parts, provided that such changes fall within the scope of the appended claim.

What is claimed is:—

A spring wheel comprising a plurality of spokes formed of flat pieces of spring metal having their outer ends curved and their inner ends provided with wedge shaped enlargements, each enlargement having a tongue on one side and a groove on the other for receiving the tongue on the adjacent enlargement, said tongues and grooves being mid-way the ends of the enlargements, means including end plates for holding said enlargements together and a rim connected with the curved ends of the spokes.

In testimony whereof I affix my signature.

WILLIAM M. SMITH.

Copies of this patent may be obtained for five cents each, by addressing the "Commissioner of Patents, Washington, D. C."